(12) United States Patent
Robinson

(10) Patent No.: US 11,307,999 B2
(45) Date of Patent: *Apr. 19, 2022

(54) DATA CACHE SEGREGATION FOR SPECTRE MITIGATION

(71) Applicant: Sony Interactive Entertainment Inc., Tokyo (JP)

(72) Inventor: Paul T. Robinson, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 165 days.

This patent is subject to a terminal disclaimer.

(21) Appl. No.: 16/870,131

(22) Filed: May 8, 2020

(65) Prior Publication Data
US 2020/0272582 A1 Aug. 27, 2020

Related U.S. Application Data

(63) Continuation of application No. 15/951,553, filed on Apr. 12, 2018, now Pat. No. 10,691,621.

(51) Int. Cl.
*G06F 12/14* (2006.01)
*G06F 12/0846* (2016.01)
*G06F 21/52* (2013.01)

(52) U.S. Cl.
CPC ...... *G06F 12/1458* (2013.01); *G06F 12/0848* (2013.01); *G06F 21/52* (2013.01); *G06F 2212/1052* (2013.01); *G06F 2212/603* (2013.01)

(58) Field of Classification Search
CPC .. G06F 12/1458; G06F 12/0848; G06F 21/52; G06F 2212/1052; G06F 2212/603; G06F 12/084; G06F 12/0897; G06F 21/74
See application file for complete search history.

(56) References Cited

U.S. PATENT DOCUMENTS

| 6,049,866 | A | * | 4/2000 | Earl | G06F 12/0802 |
| | | | | | 711/123 |
| 8,949,532 | B1 | | 2/2015 | Koh et al. | |
| 10,691,621 | B2 | * | 6/2020 | Robinson | G06F 12/0897 |
| 2010/0030964 | A1 | | 2/2010 | Aciicmez et al. | |
| 2013/0132702 | A1 | * | 5/2013 | Patel | G06F 12/1045 |
| | | | | | 711/202 |
| 2014/0325238 | A1 | | 10/2014 | Ghose | |
| 2016/0274810 | A1 | | 9/2016 | Godard et al. | |
| 2018/0212939 | A1 | * | 7/2018 | Costa | H04L 63/061 |

FOREIGN PATENT DOCUMENTS

TW 201710886 A 3/2017
TW 201738688 A 11/2017

OTHER PUBLICATIONS

Oren et al., "The Spy in the Sandbox: Practical Cache Attacks in Javascript and Their Implications", In: Proceedings of the 22nd ACM SIGSAC Conference on Computer and Communications Security. Oct. 16, 2015. Retrieved from.

* cited by examiner

*Primary Examiner* — Francisco A Grullon
(74) *Attorney, Agent, or Firm* — John L. Rogitz

(57) ABSTRACT

The data cache of a processor is segregated by execution mode, eliminating the danger of certain malware by no longer sharing the resource. Kernel-mode software can adjust the relative size of the two portions of the data cache, to dynamically accommodate the data-cache needs of varying workloads.

20 Claims, 5 Drawing Sheets

DATA CACHE SEGREGATION FOR SPECTRE MITIGATION

FIELD

The application relates generally to technically inventive, non-routine solutions that are necessarily rooted in computer technology and that produce concrete technical improvements.

BACKGROUND

A processor in a computer has at least two different operational modes. The first is typically referred to as "kernel mode" and the second may be referred to as "user mode", although other terms have been used, e.g., instead of "user mode" the mode may be referred to as an "application mode". The kernel mode is employed for core operating system (O.S.) functions, whereas the use mode is employed when the processor executes applications, i.e., computer programs directed to specific tasks that in turn rely on the O.S. Some device driver software may also be executed in the kernel mode.

Essentially, in the kernel mode the processor can access substantially all of the assets available to it. In contrast, in the user mode the processor is permitted to access only some, but not all, of the assets available to it. Limiting access in the user mode prevents an application executed by the processor from altering, and possibly damaging, critical operating system data.

Another feature of modern processors is cache memory, which is loaded with copies of selected data from main memory. Cache memory is faster than main memory, therefore accessing data in cache memory improves performance. In most cases, when the central processing unit (CPU) reads or writes main memory, a portion of the data cache (sometimes called a "cache block") is automatically allocated to contain copies of data from a corresponding portion of main memory. The data cache records the corresponding main memory address for each cache block, so that future access to the same memory address will read or write the data cache rather than directly accessing main memory, thus improving performance. Various means may be used to associate portions of data cache with portions of memory. As a simple example, given a 32-bit memory address, where the least significant bit is numbered 0, an implementation could use address bits 15-8 to select one of 256 possible data cache blocks.

Because the faster cache memory is more expensive than main memory, it is generally smaller than main memory. As the CPU accesses different parts of main memory, the copies in the data cache may be "evicted" and those portions of the data cache may be reallocated to contain more recently accessed parts of main memory. If the CPU then accesses a memory address that has been evicted from the data cache, the access is slower, because that portion of memory must have a portion of the data cache reallocated and the data must be reloaded from main memory. This difference in performance can be detected by software executing in the CPU.

Cache memory, like main memory, is generally treated as a resource shared by kernel-mode and user-mode software. User-mode software generally cannot directly read kernel-mode data from the data cache. However, user-mode software can indirectly determine which portions of the data cache have been evicted and loaded with kernel-mode data by detecting the performance difference mentioned above.

It is also a feature of modern processors to speculatively execute some tasks out of order, before they are otherwise required, to promote efficiency. As a simple example, a calculation that depends on a condition may be executed ahead of time while the processor determines whether the condition is satisfied. If the condition eventually is determined to be satisfied, the calculation already has been done and the results can be used, shortening processing time. If the condition eventually is determined not to be satisfied, the speculative calculation can simply be discarded without loss of processing time, since it was done speculatively during the wait period to determine whether the condition is satisfied.

Recent malware known as "Spectre" and "Meltdown" seeks to exploit a combination of speculative execution and data cache behavior. Fundamentally, these "exploits" influence kernel-mode software to speculatively execute instructions that ultimately evict a portion of the data cache. By using performance characteristics to determine which portion was evicted, the "exploits" can indirectly derive values of protected kernel-mode data. Variants of Spectre and Meltdown may use different means to influence speculative execution, but they all derive values of kernel-mode data by detecting differences in data cache performance.

SUMMARY

With the above in mind, present principles segregate the data cache of a processor by execution mode, eliminating the danger of certain malware by no longer sharing the cache resource between kernel mode and user mode. If desired, kernel-mode software can adjust the relative size of the two portions of the data cache, to dynamically accommodate the data-cache needs of varying workloads.

In an implementation, the processor exposes one more signal line to cache indicating the operating mode, with the cache storing memory in a partition correlated to the mode indicated by the signal line.

Accordingly, a device includes at least one central processing unit (CPU) core that in turn includes at least a first CPU thread and at least a first L1 cache accessible to the first CPU thread. Plural signal lines communicate data between the first CPU thread and the first L1 cache. The CPU thread is configured to expose a binary value on at least a mode signal line of the plural signal lines. A first binary value on the mode signal line indicates a memory address associated only with kernel mode cache, a second binary value on the mode signal line indicates a memory address associated only with user mode cache. With this technique, data associated with a user mode application can be written to and read from only user mode cache such that no user mode application can detect operations of the kernel mode cache.

In some examples, data associated with a kernel mode application can be written to and read from only kernel mode cache.

In example implementations, the user mode cache and kernel mode cache are virtual partitions of the first L1 cache. In other examples, the device includes a second L1 cache, and the user mode cache and kernel mode cache are established by the first L1 cache and second L1 cache, respectively.

In some implementations, the device may include an L2 cache, and as with the L1 cache, data associated with a user mode application can be written to and read from only user mode cache of the L2 cache such that no user mode application can detect operations in the kernel mode with the L2 cache.

When user mode and kernel mode caches are established virtually, respective sizes of the user mode cache and kernel mode cache can change during CPU operation. The size change can be according to at least one parameter under control of kernel mode software. The size change in some examples may be according to data storage amount in at least one of the user mode cache and kernel mode cache. In some implementations the sizes change according to data input/output rate in at least one of the user mode cache and kernel mode cache.

The CPU core may be a first CPU core and the device may include at least a second CPU core in a CPU package, and the first and second CPU cores share an L3 cache.

In another aspect, an apparatus includes at least one central processing unit (CPU) core that in turn includes at least a first CPU thread and an L1 cache assembly accessible to the first CPU thread. The L1 cache assembly is partitioned into user mode cache and kernel mode cache.

In another aspect, a method includes segregating data cache of a processor according to execution mode, with execution mode being either kernel mode or user mode. The method includes writing user mode application data only to user mode cache, eliminating the possibility of malware discerning operation in kernel mode cache by not sharing kernel mode cache with user mode software.

The details of the present application, both as to its structure and operation, can best be understood in reference to the accompanying drawings, in which like reference numerals refer to like parts, and in which:

DETAILED DESCRIPTION

Figure 1:
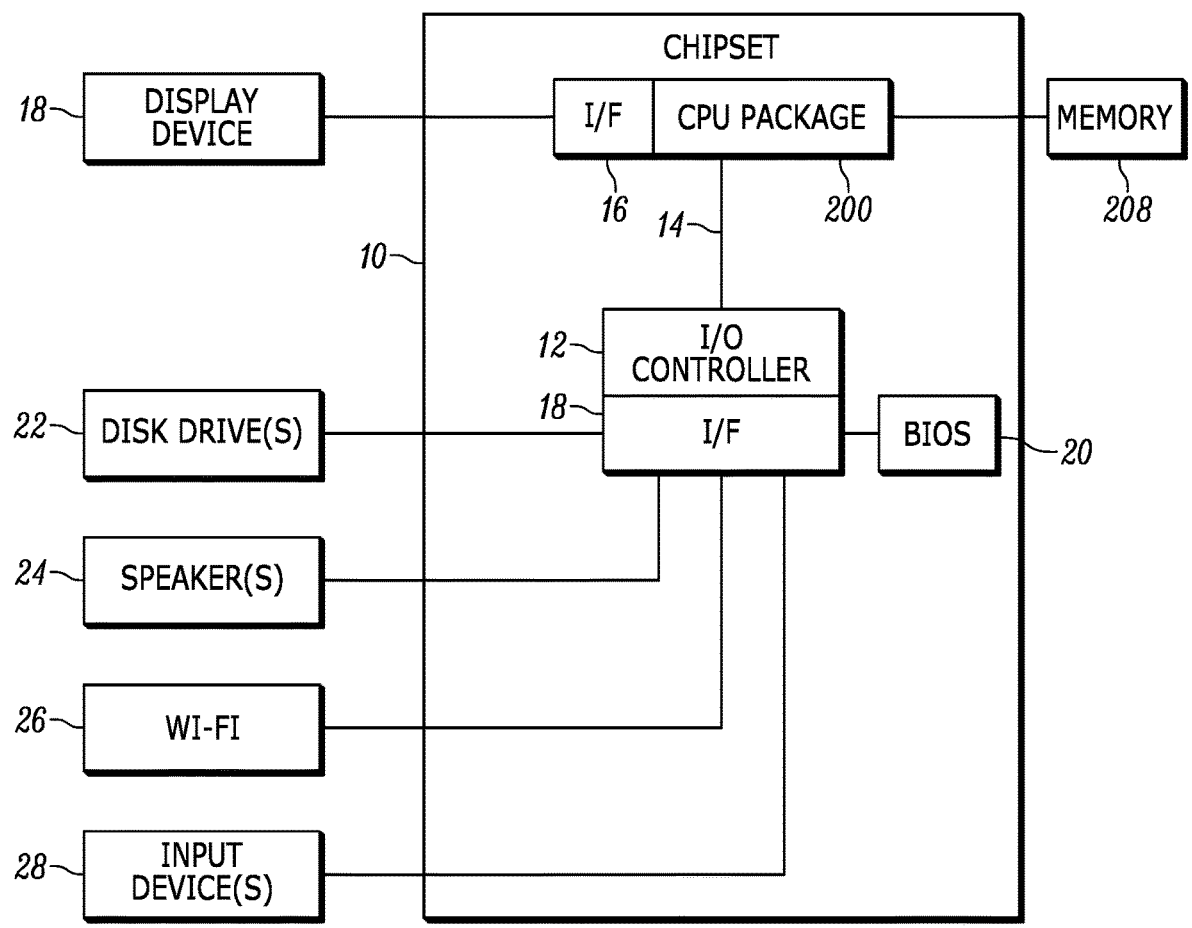
FIG. 1 is a block diagram of an example system consistent with present principles.

This disclosure relates generally to computer ecosystems including aspects of consumer electronics (CE) device networks such as but not limited to distributed computer game networks, video broadcasting, content delivery networks, virtual machines, and machine learning applications. Note that many embodiments of the segregated data cache are envisioned, with several, including computer servers and mobile telephones, described and shown herein.

A system herein may include server and client components, connected over a network such that data may be exchanged between the client and server components. The client components may include one or more computing devices including game consoles such as Sony PlayStation® and related motherboards, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple, Inc. or Google. These operating environments may be used to execute one or more user-mode programs, such as but not limited to a browser, computer game, web or smart phone application, personal computing applications such as financial or word processing programs, control programs for devices such as automobiles and manufacturing equipment, and any other application.

Servers and/or gateways may include one or more processors executing instructions that configure the servers to receive and transmit data over a network such as the Internet. Or, a client and server can be connected over a local intranet or a virtual private network. A server or controller may be instantiated by a game console and/or one or more motherboards thereof such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

As shown in FIG. 1, a central processing unit (CPU) package 200, described further below in reference to FIG. 2, can be implemented on a chipset 10, which in turn may be implemented by a group of integrated circuits or chips that may be marketed as a single product.

The example chipset 10 in FIG. 1 may communicate with an input/output controller 12 over an appropriate chip-to-chip interface 14. The CPU package 200 may interface with a memory 208, also discussed further below in reference to FIG. 2. The memory 208 may be a type of random-access memory (RAM).

The CPU package 200 may include one or more interfaces 16 such as a low-voltage differential signaling interface (LVDS), PCI-express interface, etc. that establish communication between the CPU package 200 and various peripheral devices such as a display device 18, a graphics device, a high definition multimedia interface (HDMI) device, etc.

The I/O hub controller 12 also can include various interface 18 such as but not limited to one or more of a serial ATA (SATA) interface, a low-pin count (LPC) interface, a PCI-E interface, a universal serial bus (USB) interface, a general purpose I/O interface (GPIO), a local area network (LAN) interface and other network interfaces, a power management interface, a clock generator interface, a system management bus interface (e.g., a multi-master serial computer bus interface), a serial peripheral flash memory/controller interface (SPI Flash), the latter interface for accessing boot code of a basic input output system (BIOS) 20.

The interface(s) 18 of the I/O hub controller 12 may provide for communication with, in addition to BIOS 20, input/output devices including networks. For example, the I/O controller 12 may communicate with one or more disk drives 22, audio speakers 24, Wi-Fi or other wireless transceivers 26, and input devices 28 such as keyboards, mice, microphones (for voice input), cameras, etc. The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
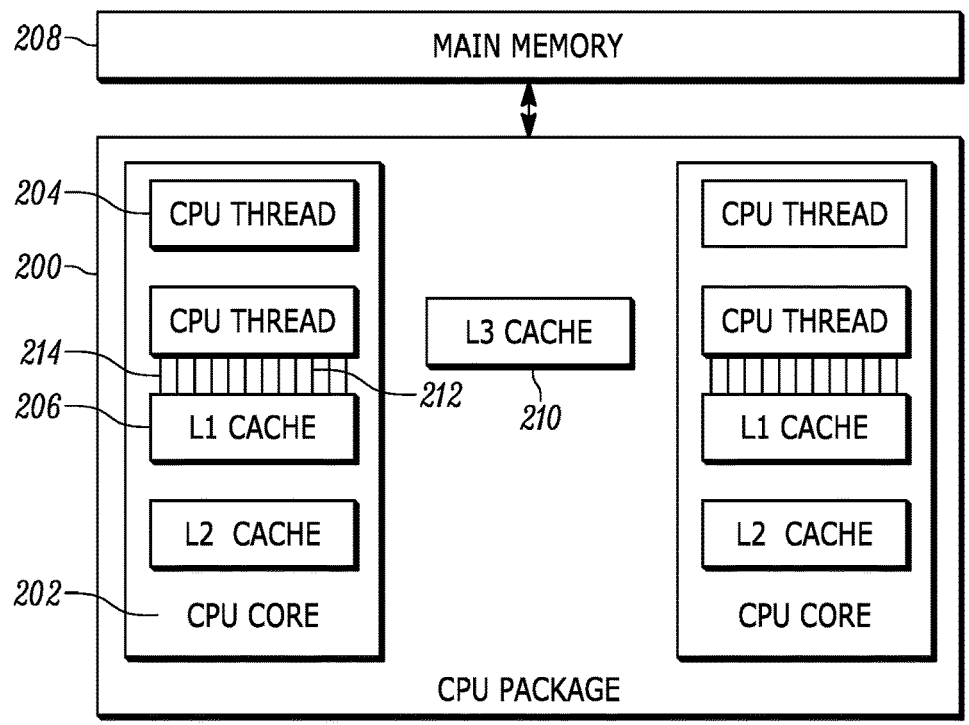
FIG. 2 is a block diagram of an example specific processing system hardware architecture.

Now referring to FIG. 2, an example central processing unit (CPU) package 200 is shown with two CPU cores 202. Each CPU core 202 may include two CPU threads 204, also referred to as hardware threads or hyper-threads. Each CPU thread 204 contains a respective set of registers and can be used to execute machine code.

Additionally, each CPU core 202 may include one or more cache memories 206, labeled "L1" and "L2" in FIG. 2 to indicate that the cache memories 206 are Level 1 and Level 2 memories, respectively. The lower level the cache, the closer it is to the CPU thread, and the smaller, faster, and more expensive it is. Likewise, the further away from the CPU and closer to main memory 208 a higher level cache is, the larger, slower, and less expensive it is.

Figure 8:
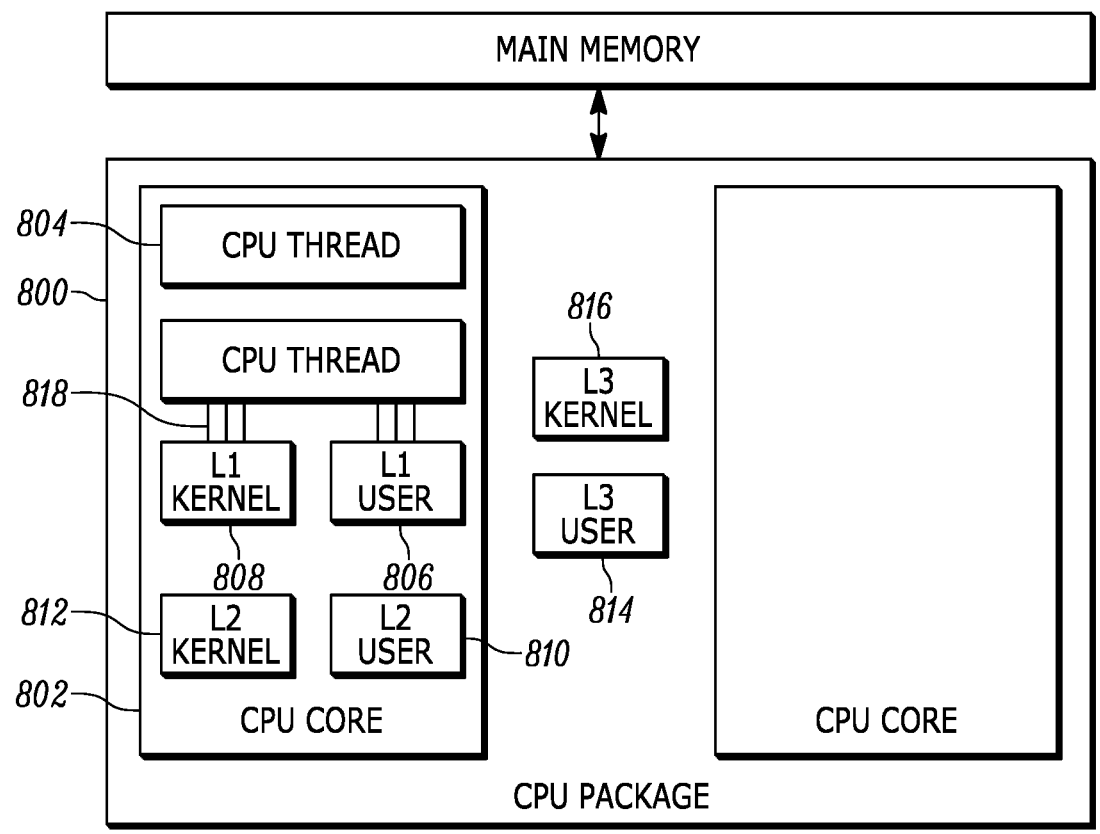
FIG. 8 is a block diagram of another example specific processing system hardware architecture.

In FIG. 2, a single hardware L1 cache is shown per CPU core, with FIG. 5 below divulging how the L1 cache is virtually partitioned between kernel memory and user mode memory. FIG. 8, as described further below, illustrates an alternate architecture that employs two hardware L1 caches per CPU core.

While FIG. 2 illustrates a simplified CPU package 200 with only two CPU cores, it is to be understood that a CPU package may include more than two cores. For example, a CPU package may include thirty CPU cores. Regardless of the number of CPU cores, in the example of FIG. 2 all of the CPU cores 202 in the CPU package 200 share a common L3 cache 210. Note that a CPU core may contain more than two levels of cache (i.e., more than a L1 level and a L2 level) or may include only one level (L1), and likewise the CPU package may contain greater or fewer than three levels of cache.

As also shown in FIG. 2 for illustration, a CPU thread 204 communicates data to and from the L1 cache 206 over plural signal lines 212. These signal lines indicate a memory address for reading or writing data, with a single memory address having plural signal lines. A predetermined mode line of the signal lines, e.g., the first signal line 214, may be used to indicate the operational mode and hence location in cache to access. For example, a "0" value on the mode line 214 may indicate kernel mode and a "1" value on the mode line 214 may indicate user mode, with the associated data being stored by the L1 cache in the partition corresponding to the mode indicated by the mode line 214. If desired, the mode line 214 may be an additional signal line to the signal lines conventionally used, or it may be a re-purposed existing signal line. In any case, a CPU thread typically accesses the L1 cache first with the memory address, and if the L1 cache has the memory address allocated, it is accessed for the read/write. Otherwise, if the memory address is not allocated in the L1 cache, the CPU thread accesses the L2 cache with the memory address to determine if the read/write can be performed in the L2 cache, and so on to the L3 cache and eventually to main memory if the required memory address is not in any of the caches.

Accordingly, while FIG. 2 illustrates a mode line between a CPU thread and the L1 cache, present principles can apply generally to other cache levels as well, e.g., to the L2 and L3 caches. Thus, while partitioning of the L1 cache between user mode and kernel mode is described, the L2 and L3 caches can also be partitioned according to operational mode consistent with present principles. Or, the L1 cache may not be partitioned between user mode and kernel mode and only one or more of the higher cache levels may be so partitioned.

Figure 3:
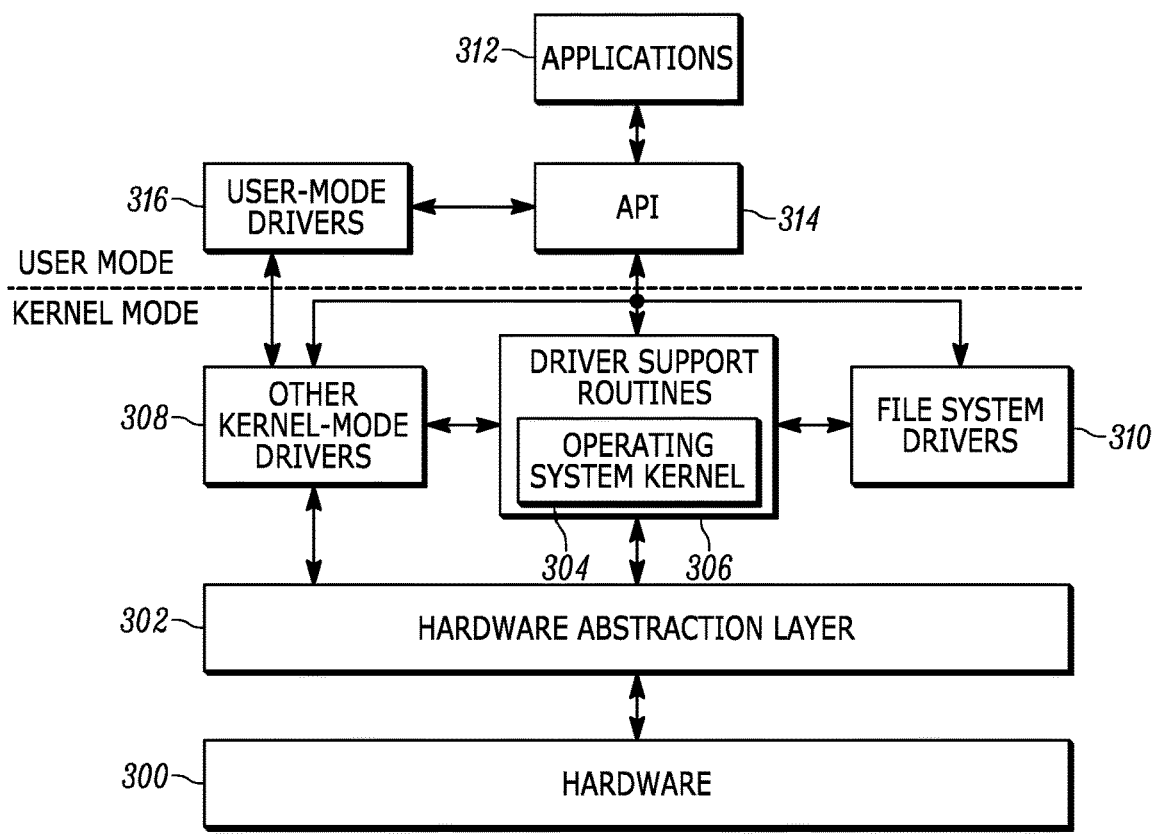
FIG. 3 is a block diagram of an example specific processing system software architecture.

FIG. 3 illustrates a software architecture on top of computer hardware 300 such as may be implemented by the architecture in FIG. 2 or FIG. 8, described more fully below. A hardware abstraction layer (HAL) 302 maps virtual addresses that are provided to applications to physical addresses in the hardware 300. An O.S. kernel 304 controls data input and output to the HAL 302 and operates in the kernel mode. Some driver support routines 306 may also be coupled to the O.S. kernel 304 and may operate in the kernel mode. Other kernel mode drivers 308 may access the driver support routines 306 and may operate in the kernel mode. Certain file system drivers 310 also may operate in the kernel mode and may access the O.S. kernel 304.

On the other hand, user applications 312 and attendant operating system application programming interfaces (API) 314 may operate in the user mode. User mode drivers 316 may also operate in the user mode through the API 314. These user mode drivers 316 may be permitted to communicate with the other kernel mode drivers 308.

Note that while the example shown assumes two operational modes, namely, user mode and kernel mode, some processors may employ more than two operational modes. For example, some architectures may include four operational modes which may be referred to as "rings" and generally pictured as nested circles, the innermost ring being the most privileged and most protected. In such a case, instead of using a single mode signal line to indicate a binary partition between two modes, two mode signal lines (totaling four binary values) can be used to indicate which one of four cache partitions is indicated. In such cases, four cache partitions (virtual or physical) are provided.

Figure 4:
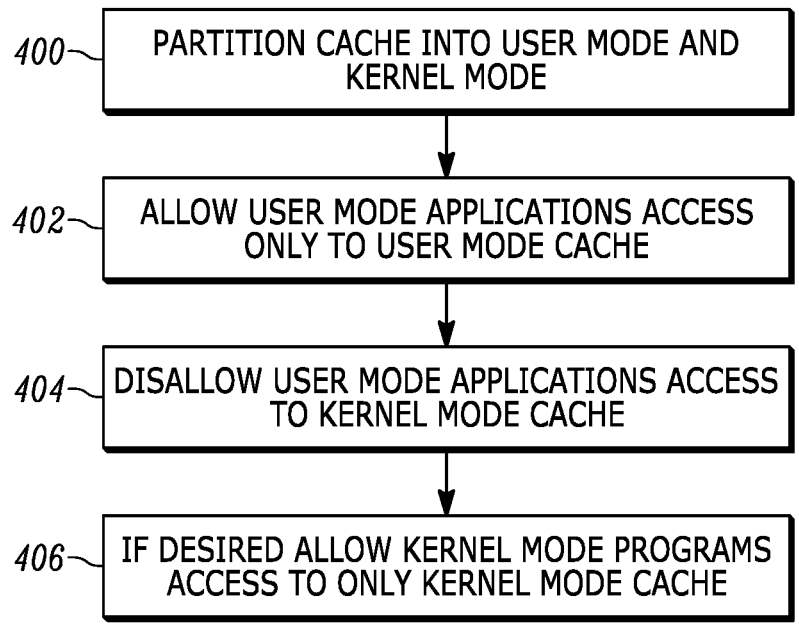
FIG. 4 is a flow chart of example overall logic consistent with present principles.
Figure 6:
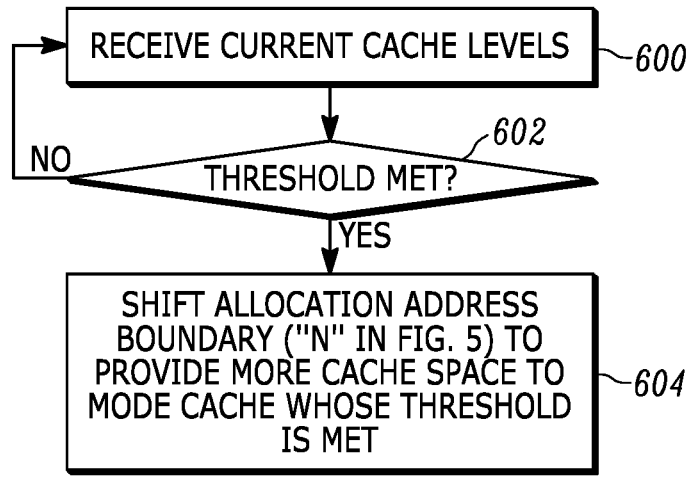
FIGS. 6 and 7 are flow charts of example dynamic cache allocation logic.
Figure 7:
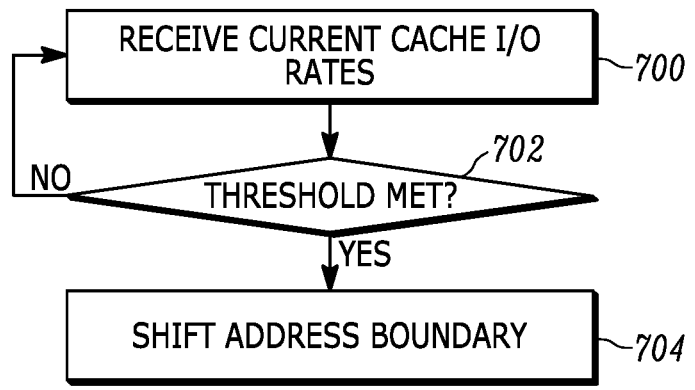

FIG. 4 illustrates overall logic consistent with present principles. Commencing at block 400, cache is partitioned into user mode cache and kernel mode cache. Only the L1 cache may be so partitioned or one or more of the higher levels of cache may also be so partitioned. The partitioning can be virtual as shown in FIGS. 2 and 5 or physical as shown in FIG. 8. When virtual, an initial group of "N-1" cache blocks may be assigned to the kernel mode partition and an initial group of "N-M" cache blocks may be assigned to the user mode partition, and those partition assignments may be fixed or may vary with time as the examples of FIGS. 6 and 7 illustrate. In any case, a cache block for kernel mode cache has its mode signal line 214 binary value equal to the binary value used to indicate "kernel mode" while a memory address for user mode cache has its mode signal line 214 binary value equal to the binary value used to indicate "user mode".

When physical cache partitioning is used as shown in FIG. 8 and described further below, the cache blocks for the kernel mode physical cache have their mode signal line binary values all equal to the binary value used to indicate "kernel mode" while the memory addresses for user mode physical cache have their mode signal line binary values all equal to the binary value used to indicate "user mode".

Moving to block 402, during CPU operation in the user mode, all user mode applications are allowed to execute read/write operations only to the user mode cache. Block 404 essentially emphasizes that user mode applications are disallowed from accessing or otherwise "seeing" kernel mode cache including data operations such as data eviction from kernel mode cache.

In some examples, block 406 indicates that programs operating in the kernel mode may be likewise allowed to access only kernel mode cache at least in terms of storing (writing) and if desired also retrieving (reading) kernel mode data, although kernel mode programs such as the O.S. typically may be allowed to access user mode cache on behalf of user mode applications to read and write user mode data from and to user mode cache on behalf of such user mode programs.

Figure 5:
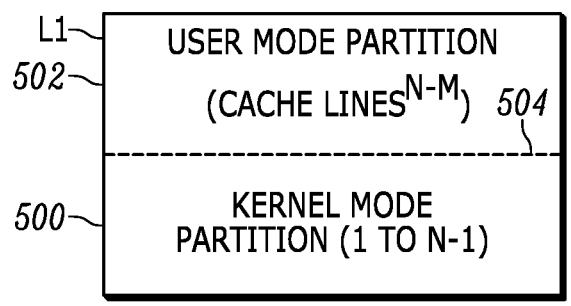
FIG. 5 is a schematic diagram of cache partitioned between user mode and kernel mode.

FIG. 5 illustrates a single physical L1 cache that is partitioned into a kernel mode-only data partition 500 into which only kernel mode data may be written and read and a user mode partition 502 into which only user mode data may be written and read. The dashed line 504 indicates the boundary between the virtual user mode cache 502 and virtual kernel mode cache 500. For illustration, the kernel mode partition 500 may be assigned cache blocks 0 to N-1, with "N" being an integer greater than zero, and the user mode partition may be assigned cache lines N-M, with "M" being an integer greater than "N".

During operation, the sizes of the user mode cache 502 and kernel mode cache 500 may change, i.e., conceptually moving the line 504 up or down to grow the size of one of the mode caches at the expense of the other. In an example, one or more parameters under the control of kernel-mode software can be used for this purpose.

FIGS. 6 and 7 illustrate optional alternate techniques for dynamically allocating cache blocks between user mode cache 502 and kernel mode cache 500 in FIG. 5. Commencing at block 600 in FIG. 6, current data storage levels are identified in the kernel mode and user mode caches. If one of the data storage levels is determined to satisfy a threshold at decision diamond 602, additional cache blocks may be allocated to it at block 604, taken from the other (less full) mode cache. Conceptually, the boundary 504 in FIG. 5 is shifted toward the mode cache giving up blocks to the other mode cache, with "N" in the example shown thus dynamically varying.

In the alternative implementation of FIG. 7, block 700 current data usage, e.g., in terms of I/O operations per unit time, is identified in the kernel mode and user mode caches. If one of the data usages is determined to satisfy a threshold at decision diamond 702, additional cache blocks may be allocated to it at block 704, taken from the other (less used) mode cache. Conceptually, the boundary 504 in FIG. 5 is shifted toward the mode cache giving up blocks to the other mode cache, with "N" in the example shown thus dynamically varying.

Now referring to FIG. 8, an example CPU package 800 is shown with two CPU cores 802 that are identical to each other in configuration and operation, so only the components of one core are shown. Each CPU core 802 may include two CPU threads 804. Each CPU thread 804 contains a respective set of registers and can be used to execute machine code.

Additionally, each CPU core 802 may include two physical level one (L1) caches 806, 808. A first L1 cache 806 is for user mode operation and a second L1 cache 808 for kernel mode operation only. When greater than two operational modes are employed, a concomitant number of physical L1 caches may be provided. Operation of the L1 caches in FIG. 8 mirrors that of the virtual L1 cache partitioning described previously, except that instead of virtual cache partitions physical cache partitions are established by the caches 806, 808.

In FIG. 8, physical mode partitioning also is envisioned between user mode and kernel mode L2 physical caches 810, 812 and user mode and kernel mode physical L3 caches 814, 816, it being understood that as is the case with virtual partitioning by mode, only the L1 cache need be partitioned and, hence, only a single L2 cache per core and single L3 cache per package need be used in other examples. As was the case for the virtual cache mode partitioning in FIG. 2, in FIG. 8 the CPU package 800 may include more than two cores, and that a CPU core 802 may contain more than two levels of cache (i.e., more than a L1 level and a L2 level) or may include only one level (L1), and likewise the CPU package may contain greater or fewer than three levels of cache.

As also shown in FIG. 8 for illustration, a CPU thread 804 communicates data to and from the L1 caches 806, 808 over plural signal lines 818 that indicate a memory address for reading or writing data, with a mode line of the signal lines used to indicate the operational mode and hence which one of the physical L1 caches 806, 808 for which access is sought.

Note that a combination of virtual and physical cache partitioning may be used. For example, the L1 cache may be virtually partitioned according to, e.g., FIG. 5 while the L2 cache may be physically partitioned according to, e.g., FIG. 8.

It will be appreciated that whilst present principals have been described with reference to some example embodiments, these are not intended to be limiting, and that various alternative arrangements may be used to implement the subject matter claimed herein.

What is claimed is:

1. A device comprising:
at least one central processing unit (CPU) assembly comprising:
at least a first CPU thread;
at least a first cache accessible to the first CPU thread;
plural signal lines for communicating data between the first CPU thread and the first cache, the CPU thread being configured to expose a value on at least a first signal line of the plural signal lines, a first value on the first signal line indicating a memory address associated with first mode cache, a second value on the first signal line indicating a memory address associated with second mode cache, wherein data associated with a second mode application can be written to and read from second mode cache such that no second mode application can detect operations of the first mode cache.

2. The device of claim 1, wherein data associated with a first mode application can be written to and read from first mode cache.

3. The device of claim 1, wherein the second mode cache and first mode cache are virtual partitions of the first cache.

4. The device of claim 1, comprising a second cache, wherein the second mode cache and first mode cache are established by the first cache and second cache, respectively.

5. The device of claim 1, comprising third cache, wherein data associated with a second mode application can be written to and read from second mode cache of the third cache such that no second mode application can detect operations in the first mode with the third cache.

6. The device of claim 3, wherein respective sizes of the second mode cache and first mode cache change during CPU operation.

7. The device of claim 6, wherein the sizes change according to at least one parameter under control of first mode software.

8. The device of claim 6, wherein the sizes change according to data storage amount in at least one of the second mode cache and first mode cache.

9. The device of claim 6, wherein the sizes change according to data input/output rate in at least one of the second mode cache and first mode cache.

10. The device of claim 1, wherein the CPU assembly comprises a first CPU core and the device comprises at least a second CPU core in a CPU package, and the first and second CPU cores share at least one cache.

11. An apparatus comprising:
at least one central processing unit (CPU) core comprising:
at least a first CPU thread;
cache assembly accessible to the first CPU thread; and
plural signal lines for communicating data between the first CPU thread and the cache assembly, the CPU thread being configured to expose a value on at least a first signal line of the plural signal lines, a first value on the first signal line indicating a memory address associated with a first mode cache of the cache assembly, a second value on the first signal line indicating a memory address associated with a second mode cache of the cache assembly.

12. The apparatus of claim 11, wherein the cache assembly comprises a single physical cache portioned into the second mode cache and first mode cache.

13. The apparatus of claim 11, wherein the cache assembly comprises a first physical cache establishing the second mode cache and a second physical cache establishing the first mode cache.

14. The apparatus of claim 11, wherein during CPU operation in a second mode, second mode applications are allowed to execute input/output operations to the second mode cache, with second mode applications being disallowed from accessing first mode cache including data eviction from first mode cache.

15. The apparatus of claim 14, wherein programs operating in a first mode are allowed to access first mode cache for writing first mode data.

16. The apparatus of claim 11, wherein data associated with a second mode application can be written to and read from second mode cache such that no second mode application can detect operations of the first mode cache.

17. The apparatus of claim 11, comprising third cache, wherein data associated with a second mode application can be written to and read from second mode cache of the third cache such that no second mode application can detect operations in the first mode with the third cache.

18. The apparatus of claim 11, wherein the CPU core is a first CPU core and the apparatus comprises at least a second CPU core in a CPU package, and the first and second CPU cores share an L3 cache.

19. A method, comprising:
segregating data cache of a processor according to execution mode, execution mode comprising first mode and second mode; and
exposing a value on at least a first signal line of plural signal lines, a first value on the first signal line indicating a memory address associated with the first mode, a second value on the first signal line indicating a memory address associated with the second mode.

20. The method of claim 19, comprising using kernel-mode software to adjust relative sizes of the first mode cache and second mode cache.

* * * * *